Figure 1:
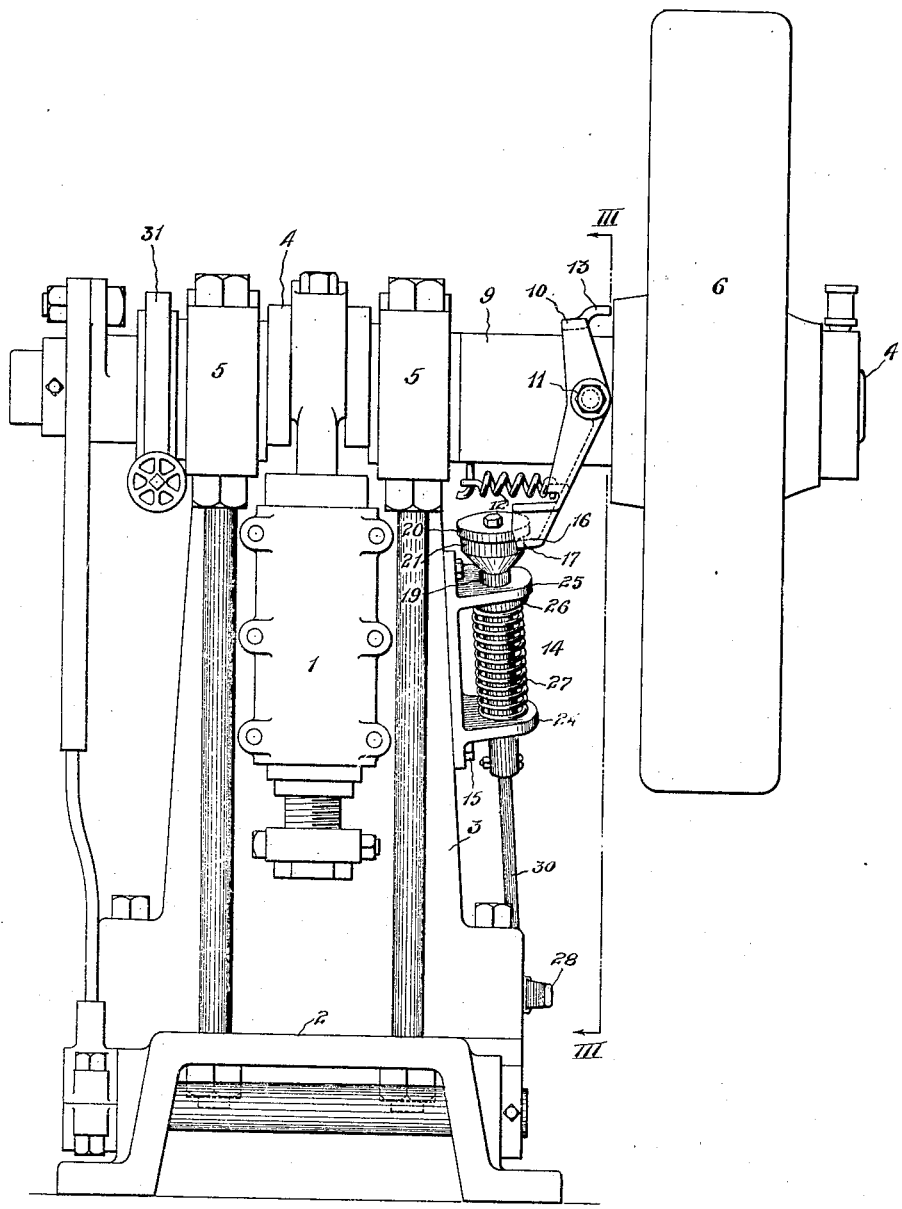

M. C. FRANCE.
SAFETY CONTROL FOR POWER PRESSES AND THE LIKE.
APPLICATION FILED AUG. 12, 1918.
1,340,333.
Patented May 18, 1920.
2 SHEETS—SHEET 2.
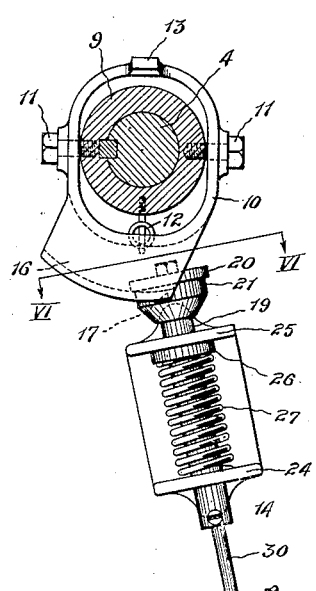
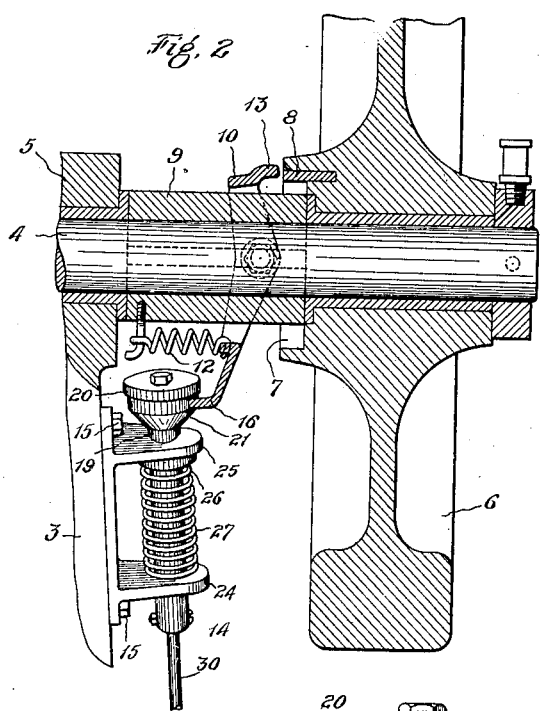
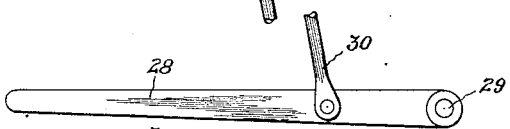
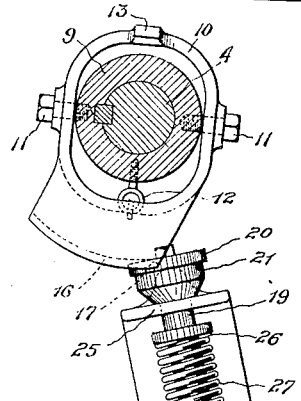
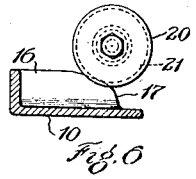
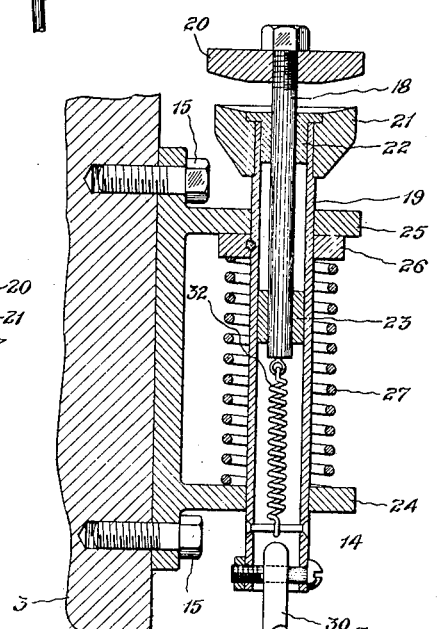

UNITED STATES PATENT OFFICE.

MERLE C. FRANCE, OF CLEVELAND, OHIO.

SAFETY CONTROL FOR POWER-PRESSES AND THE LIKE.

1,340,333. Specification of Letters Patent. Patented May 18, 1920.

Application filed August 12, 1918. Serial No. 249,477.

*To all whom it may concern:*

Be it known that I, MERLE C. FRANCE, a citizen of the United States, residing at Cleveland, in the county of Cuyahoga and State of Ohio, have invented certain new and useful Improvements in Safety Controls for Power-Presses and the like, of which the following is a specification.

The principal object of this invention is the provision of a safety device or control for power presses and other machines in which there is one complete movement or operation performed by or in synchronism with the rotation of a shaft.

A further object of the invention is the provision of control mechanism capable of being operated to permit the limited revolution of a shaft and then to positively disengage the shaft from its driving connection, thereby causing its rotation to cease.

A further object of the invention is the provision of controlling mechanism operable for permitting the connection of driving and driven members of a machine for performing a single operation, the controlling mechanism being then adapted to prevent further operation of the machine until the controlling mechanism has been again operated. As indicated, my invention is particularly suitable for application to power presses and similar machinery for prevention of accidents to the operators thereof or to the machine by rendering it impossible for the machine to make more than one stroke or perform more than one operation consecutively upon a single operation of the controlling mechanism. To accomplish this result my safety control is so arranged that it must be returned to its initial position and operated for each stroke or operation which the machine is to perform.

In the accompanying drawings, Figure 1 is a front elevation of a power press equipped with my invention; Fig. 2 is a partial, longitudinal, vertical, section through the shaft of the press shown in Fig. 1; Fig. 3 is a vertical transverse section on line III—III of Fig. 1, showing the striker and safety control mechanism, with the striker in its normal inoperative position; Fig. 4 is a similar view to that shown in Fig. 3 with the exception that in Fig. 4 the machine has completed an operation and the striker is shown thrown out of engagement by the safety stop upon the completion of the operation; Fig. 5 is a section through my safety control device showing the details of its construction; and Fig. 6 is a section on line VI—VI of Fig. 3.

In the drawings, 1 represents the power press which I have chosen for illustrating one application of my invention. 2 is the bed of the press and 3 the frame. As shown in the drawings, the machine is a well known type of crank press having a crank shaft 4, journaled in bearings 5, 5. The driving fly wheel, 6, is revolubly carried upon an extension of shaft, 4, in a well known manner. The hub of the fly wheel is provided with an annular recess, 7, in which there are provided one or more driving or striker projections, 8, which may be formed integral with the hub or fixed thereto in any convenient manner. For convenience, a sleeve, 9, is keyed or otherwise secured to the shaft, 4. For the purposes of description, the sleeve, 9, will be herein considered as an integral, enlarged part of shaft, 4. A striker lever, 10, spans the enlarged portion of the shaft, 4, and is pivoted thereto by bolts 11, 11. A spring, 12, connecting the striker, 10, and shaft, 4, acts to normally force the driving lug, 13, of the striker into the recess, 7, so that it will be engaged by one of the projections, 8, upon the revolution of the fly wheel, 6, and thereby cause the revolution of the shaft, 4.

It will be seen that the movements of the striker are in a plane parallel to the axis of rotation of the shaft, 4, and that it moves substantially longitudinally of the shaft into and out of the position in which it is engaged by the driving projection, 8.

In order to hold the striker, 10, out of engagement with the driving projection, 8, upon the fly wheel, 6, except when it is desired that the shaft, 4, be rotated, I provide the control mechanism, 14, which is shown secured to the frame, 3, of the machine by bolts, 15, 15, but which, it will be understood, may be secured to any stationary object either upon or adjacent to the machine. The striker, 10, is provided at its end opposite the lug, 13, with a side cam, 16, which is provided with a somewhat rounded end, 17. The safety control device, best seen in Fig. 5, consists of the telescoped plungers, 18 and 19, the former of which is provided with a cylindrical disk head, 20, constituting a safety stop member, and the latter of which is provided with a cylindrical head, 21, constituting a combined trigger and safety stop or lock. The diameter of the head, 20, of plunger, 18, is made somewhat larger than the diameter of the head, 21, of plunger, 19, for a purpose to be presently described. Plunger, 18, slides freely in bushings, 22 and 23, of plunger, 19, and normally stands with its head, 20, resting upon the head, 21, of plunger, 19, as seen in Figs. 1, 2, 3, and 4 of the drawings. Plunger, 19, slides freely in the stationary support brackets, 24, 25. A collar, 26, is pinned to plunger, 19, forming a transverse shoulder thereon, while a spring, 27, inserted between the lower bracket, 24, and the collar, 26, yieldingly supports the plunger, 19, at the top of its travel at which point it is arrested by the collar, 26, striking the upper bracket, 25. An operating lever, 28, fulcrumed at, 29, to the frame, 3, of the machine or to any other stationary support, is connected to the lower end of the plunger, 19, by a connecting rod, 30. It will be understood that any other convenient means for depressing the plunger, 19, may be provided. The cam, 16, of striker, 10, normally stands in engagement with head, 21, of plunger, 19, with the driving lug, 13, entirely disengaged from the projection, 5, and the shaft, 4, is normally stationary. A brake, 31, or other restraining means is provided to hold the shaft stationary against its tendency to be rotated by the friction of the revolving fly wheel upon it.

A spring, 32, may be connected between plungers, 18, and 19, to insure the prompt return of the head, 20, of plunger, 18, to its seat upon the head, 21, of plunger, 19. The use of spring 32, also permits my safety control to be installed in an inverted position when necessary. The operation of my invention when applied to a power press as shown in the drawings is as follows:

Assuming that the fly wheel, 6, is being rotated by a belt or other power transmitting means, the shaft, 4, will be stationary as the striker, 10, will be held out of engagement with the driving projections, 8, by the cam, 16, contacting with the head, 21, of plunger, 19. In order to make the shaft, 4, rotate and thereby cause a stroke of the press, the trigger or plunger, 19, is depressed against the yielding spring, 27, by operating the lever, 28, or other operating means. The head, 20, of plunger, 18, being larger in diameter than head, 21, of plunger, 19, is engaged by the edge of the cam, 16, and not allowed to follow the downward movement of head, 21. The separation of heads, 20 and 21, best shown in Fig. 5, permits the cam, 16, to enter between them and the striker, 10, to be rocked about its pivot by the spring, 12, so that the lug, 13, enters the recess, 7, and is engaged by one of the projections, 8. This will cause the shaft, 4, to rotate. As soon as the cam, 16, has passed through the opening between heads, 20 and 21, plunger, 18, will drop down by gravity or the action of spring, 32, until the head, 20, is arrested by head, 21. If the operator should now permit plunger, 19, to rise to its normal position during the revolution of shaft, 4, the cam, 16, as it is about to complete a revolution with shaft, 4, will again engage head, 21, and cause the disengagement of the driving lug, 13, from the projection, 8, thereby breaking the driving connection between fly wheel, 6, and shaft, 4, and permitting the latter to come to rest. Should the operator hold plunger, 19, depressed, cam, 16, will, as it is about to complete a revolution with shaft, 4, strike the head, 20, and by it the striker, 10, will be thrown out of engagement with the projection on the fly wheel, thus breaking the driving connection between the fly wheel and the shaft. In order to cause the machine to take another stroke, it is necessary that the plunger, 19, be allowed to rise until the projecting edge of head, 20, is above cam, 16, after which, upon the depression of plunger, 19, the cycle of movements above described will be repeated.

Due to the diameter of head, 20, being larger than that of head, 21, the striker, when its cam engages head 21, will be thrown out of engagement with the driving projection before the shaft, 4, has made a complete revolution but this is not objectionable and, in fact, is some times an advantageous feature. With my improvement it is necessary for the operator to return the controlling lever to its initial position and move it into operating position for each and every stroke of the machine.

The advantage of my improvement, including simplicity of construction, ready application to either existing or new machines, low cost, and additional safety to the operator, will be apparent to those skilled in the art. Modifications of my improvement may be made without departing from the scope of the invention.

I claim and desire to secure by Letters Patent:

1. In a safety control for power presses and the like, a revoluble shaft; driving means for said shaft comprising a revolving member provided with a driving projection; a striker mounted for rotation with said shaft, adapted to engage said projection; yielding means for moving said striker into position to engage said projection and rotate said shaft, said striker being provided with a cam adapted to engage a stop member normally held in the path of rotation of said striker to cause the disengagement of said striker and said projection; controlling means comprising two plungers one telescoped within the other, the outer of said plungers being longitudinally movable into and out of the path of said striker, the inner of said plungers being provided with an enlarged head forming a shoulder normally resting upon the end of the outer of said plungers and extending radially beyond the side thereof, said inner plunger being longitudinally movable to permit said head to engage said cam, said outer plunger and the head of said inner plunger constituting stop members; means for moving said outer plunger out of the path of said striker, said striker having a shoulder adapted to engage said shoulder on said inner plunger to hold the latter out of the path of said striker until said shaft has turned a portion of a revolution, said inner plunger being adapted, when its shoulder has been released by said striker, to move into the path of said striker to engage said cam and cause the disengagement of said striker from said projection.

2. In apparatus of the class described, a revoluble shaft; driving means for said shaft comprising a revolving member provided with a driving projection; a striker mounted for rotation with said shaft and adapted to engage said projection; yielding means for moving said striker into position to engage said projection and rotate said shaft; a stop member normally in the path of rotation of said striker, said striker being provided with a cam adapted upon the rotation of said striker to engage said stop member and disengage said striker from said projection; means for moving said stop member out of the path of rotation of said striker to permit said striker to move into position to engage said projection; a second stop member normally supported by said first named stop member out of the path of rotation of said striker, said striker having a shoulder adapted to support said second stop member during a portion of a revolution of said striker; said second stop member being adapted, upon the movement of said first named stop member out of the path of rotation of said striker and the subsequent revolution of said striker, to move into position to engage said cam and disengage said striker from said projection.

3. In apparatus of the class described, a revolving driving member provided with a driving projection; a revoluble driven member; a driving connection between said driving and driven members comprising a striker carried by said driven member secured thereto for rotation therewith and adapted to be moved into and out of position to engage said striker projection on said driving member; yielding means for moving said striker into said position; and a safety control device comprising a pair of telescoped plungers movable into and out of the path of rotation of said striker, each plunger being adapted when in said path to engage said striker and disengage it from said projection; the outer of said plungers being normally in said path, the inner of said plungers being held normally out of said path by said outer plunger but adapted to move into said path upon the removal of said outer plunger from said path; and means for moving said outer plunger out of said path.

4. In a safety control for power presses and the like, a revoluble shaft; driving means for said shaft comprising a revolving member provided with a driving projection, a striker mounted for rotation with said shaft, and yielding means for moving said striker longitudinally of said shaft into position to engage said projection; controlling means comprising a stop member normally in the path of rotation of said striker adapted to engage said striker and hold it out of engagement with said projection, means for withdrawing said stop member from said path of rotation to permit said striker to engage said projection and rotate said shaft, a second stop member normally supported by said first named stop member out of the path of rotation of said striker, said second stop member being adapted upon the withdrawal of said first named stop member from said path of rotation and upon the subsequent rotation of said striker to move into said path engage said striker and disengage it from said projection.

5. In apparatus of the class described, a shaft, driving means for said shaft comprising a revolving member provided with a driving projection; a striker mounted for rotation with said shaft adapted to be moved longitudinally of said shaft into and out of position to engage said striker projection; yielding means for moving said striker into said position; means for moving said striker out of said position comprising a stop member adapted to be moved into and out of the path of rotation of said striker, said striker being provided with a cam adapted upon rotation to engage said stop member and move said striker out of engagement with said projection; means for withdrawing said stop member from said path of rotation, and a safety stop member supported by said first named stop member out of said path of rotation when said first named stop member is in said path, adapted to move into said path upon the withdrawal of said first named stop member therefrom, said striker being provided with means for holding said safety stop member out of the path of rotation of said striker for a portion of a revolution of said shaft.

6. In apparatus of the class described, a revoluble driven member, a revolving driving member provided with a driving projection, a striker mounted on said driven member secured thereto for rotation therewith and adapted to be moved into and out of the path of rotation of said projection; means for moving said striker into said path; and a safety control device consisting of two telescoped plungers mounted in a stationary support and separately movable into and out of the path of rotation of said striker, said striker being provided with a cam adapted upon rotation to engage that one of said plungers which is in its path to thereby disengage said striker from said projection; one of said plungers being normally in engagement with said cam and the other of said plungers being normally supported by said first named plunger out of the path of rotation of said striker and adapted, upon the withdrawal of said first named plunger from engagement with said cam, to move into the path of rotation of said striker.

7. In apparatus of the class described, a revoluble driven member, a revolving driving member provided with a driving projection, a striker mounted on said driven member secured thereto for rotation therewith and adapted to be moved into and out of the path of rotation of said projection; means for moving said striker into said path; and a safety control device consisting of two telescoped plungers mounted in a stationary support and separately movable into and out of the path of rotation of said striker, said striker being provided with a cam adapted upon rotation to engage that one of said plungers which is in its path to thereby disengage said striker from said projection; one of said plungers being normally in engagement with said cam and the other of said plungers being normally supported by said first named plunger out of the path of rotation of said striker and adapted, upon the withdrawal of said first named plunger from engagement with said cam, to move into the path of rotation of said striker, said striker being provided with means engaging said second named plunger to hold the same out of the path of rotation of said striker until said striker has rotated a portion of a revolution.

8. In apparatus of the class described, a driving and a driven member mounted for movement in parallel planes; normally engaged driving means pivoted to one of said members for movement in a plane transverse to the plane of movement of said driving and driven members and adapted to engage the other one of said members whereby movement of said driving member is imparted to said driven member; means for causing said engagement; said driving means being provided with a cam; a stop member normally in the path of movement of said driving means adapted to co-act with said cam and disengage said driving means; means for withdrawing said stop member from the path of movement of said driving means; and a second stop member normally held out of the path of movement of said driving means by said first named stop member adapted, upon the withdrawal of said first named stop member from said path of movement of said driving means to move into said path, co-act with said cam and disengage said driving means.

9. In apparatus of the class described, co-axial, revoluble driving and driven members; driving means mounted on one of said members for rotation therewith and for movement in a plane parallel to the axis of said rotation to engage the other of said members whereby movement of said driving member is imparted to said driven member; means for causing said engagement; a stop member normally in the path of rotation of said driving means; said driving means being provided with a cam adapted to co-act with said stop member and disengage said driving means; means for withdrawing said stop member from the path of rotation of said driving means; and a second stop member normally held out of the path of rotation of said driving means by said first named stop member, adapted, upon the withdrawal of said first named stop member from said path of rotation of said driving means, to move into said path, engage said cam and disengage said driving means.

10. In apparatus of the class described, a revoluble driving member provided with a driving projection; a revoluble driven member; a driving connection between said driving and driven members comprising a striker carried by said driven member secured thereto for rotation therewith and adapted to be moved into and out of position to engage said striker projection on said driven member; and a safety control device comprising a pair of telescoped plungers movable into and out of the path of rotation of said striker, each plunger being adapted when in said path to engage said striker and disengage it from said projection; one of said plungers being normally in said path and the other of said plungers being held normally out of said path by said first named plunger and adapted to move into said path upon the removal of said first named plunger from said path; and means for moving said first named plunger out of said path.

11. In apparatus of the class described, revoluble driving and driven members; driving means mounted on one of said members for rotation therewith and adapted to engage the other of said members to cause the movement of said driving member to be imparted to said driven member; means for causing said engagement; and a safety control device comprising a pair of telescoped plungers movable into and out of the path of rotation of said driving means, each plunger being adapted when in said path to engage said driving means and disengage it from said projection; one of said plungers being normally in said path, the other of said plungers being held normally out of said path by said first named plunger but adapted to move into said path upon the removal of said first named plunger from said path and means for moving said first named plunger out of said path.

In testimony whereof I affix my signature in the presence of two witnesses.

MERLE C. FRANCE.

Witnesses:
 LOUIS A. CORLETT,
 HELENE KAAGE.